(12) United States Patent
Mahan et al.

(10) Patent No.: US 8,698,819 B1
(45) Date of Patent: *Apr. 15, 2014

(54) SOFTWARE ASSISTED SHADER MERGING

(75) Inventors: Justin Michael Mahan, Fremont, CA (US); Edward A. Hutchins, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 812 days.

This patent is subject to a terminal disclaimer.

(21) Appl. No.: 11/893,439

(22) Filed: Aug. 15, 2007

(51) Int. Cl.
*G06T 15/00* (2011.01)
*G06T 1/20* (2006.01)

(52) U.S. Cl.
USPC .......................................... 345/522; 345/506

(58) Field of Classification Search
None
See application file for complete search history.

(56) References Cited

U.S. PATENT DOCUMENTS

| | | |
|---|---|---|
| 3,091,657 A | 5/1963 | Stuessel |
| 3,614,740 A | 10/1971 | Delagi et al. |
| 3,987,291 A | 10/1976 | Gooding et al. |
| 4,101,960 A | 7/1978 | Stokes et al. |
| 4,541,046 A | 9/1985 | Nagashima et al. |
| 4,566,005 A | 1/1986 | Apperley et al. |
| 4,748,585 A | 5/1988 | Chiarulli et al. |
| 4,897,717 A | 1/1990 | Hamilton et al. |
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 5,040,109 A | 8/1991 | Bowhill et al. |
| 5,047,975 A | 9/1991 | Patti et al. |
| 5,175,828 A * | 12/1992 | Hall et al. ............... 719/331 |
| 5,179,530 A | 1/1993 | Genusov et al. |
| 5,197,130 A | 3/1993 | Chen et al. |
| 5,210,834 A | 5/1993 | Zurawski et al. |
| 5,263,136 A | 11/1993 | DeAguiar et al. |
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,430,841 A | 7/1995 | Tannenbaum et al. |

(Continued)

FOREIGN PATENT DOCUMENTS

| | | |
|---|---|---|
| JP | H08-077347 | 3/1996 |
| JP | H08-153032 | 6/1996 |

(Continued)

OTHER PUBLICATIONS

Merriam-Webster Dictionary Online; Definition for "program"; retrieved Dec. 14, 2010.*

(Continued)

*Primary Examiner* — Carlos Perromat

(57) ABSTRACT

Embodiments for programming a graphics pipeline, and modules within the graphics pipeline, are detailed herein. One embodiment described a method of implementing software assisted shader merging for a graphics pipeline. The method involves accessing a first shader program in memory, and generating a first shader instruction from that program. This first instruction is loaded into an instruction table at a first location, indicated by an offset register. A second shader program in memory is then accessed, and used to generate a second shader instruction. The second shader instruction is loaded into the instruction table at a second location indicated by the offset register.

20 Claims, 11 Drawing Sheets

(56) References Cited

U.S. PATENT DOCUMENTS

| | | | |
|---|---|---|---|
| 5,430,884 A | 7/1995 | Beard et al. |
| 5,432,905 A | 7/1995 | Hsieh et al. |
| 5,517,666 A | 5/1996 | Ohtani et al. |
| 5,522,080 A | 5/1996 | Harney |
| 5,560,030 A | 9/1996 | Guttag et al. |
| 5,561,808 A | 10/1996 | Kuma et al. |
| 5,574,944 A | 11/1996 | Stager |
| 5,627,988 A | 5/1997 | Oldfield |
| 5,644,753 A | 7/1997 | Ebrahim et al. |
| 5,649,173 A | 7/1997 | Lentz |
| 5,666,169 A | 9/1997 | Ohki et al. |
| 5,682,552 A | 10/1997 | Kuboki et al. |
| 5,682,554 A | 10/1997 | Harrell |
| 5,706,478 A * | 1/1998 | Dye ........................... 345/503 |
| 5,754,191 A | 5/1998 | Mills et al. |
| 5,761,476 A | 6/1998 | Martell |
| 5,764,243 A | 6/1998 | Baldwin |
| 5,784,590 A | 7/1998 | Cohen et al. |
| 5,784,640 A | 7/1998 | Asghar et al. |
| 5,796,974 A | 8/1998 | Goddard et al. |
| 5,802,574 A | 9/1998 | Atallah et al. |
| 5,809,524 A | 9/1998 | Singh et al. |
| 5,812,147 A | 9/1998 | Van Hook et al. |
| 5,835,788 A | 11/1998 | Blumer et al. |
| 5,848,254 A | 12/1998 | Hagersten |
| 5,920,352 A | 7/1999 | Inoue |
| 5,925,124 A | 7/1999 | Hilgendorf et al. |
| 5,940,090 A | 8/1999 | Wilde |
| 5,940,858 A | 8/1999 | Green |
| 5,949,410 A | 9/1999 | Fung |
| 5,950,012 A | 9/1999 | Shiell et al. |
| 5,978,838 A | 11/1999 | Mohamed et al. |
| 5,999,199 A | 12/1999 | Larson |
| 6,009,454 A | 12/1999 | Dummermuth |
| 6,016,474 A | 1/2000 | Kim et al. |
| 6,041,399 A | 3/2000 | Terada et al. |
| 6,049,672 A | 4/2000 | Shiell et al. |
| 6,073,158 A | 6/2000 | Nally et al. |
| 6,092,094 A | 7/2000 | Ireton |
| 6,108,766 A | 8/2000 | Hahn et al. |
| 6,112,019 A | 8/2000 | Chamdani et al. |
| 6,131,152 A | 10/2000 | Ang et al. |
| 6,141,740 A | 10/2000 | Mahalingaiah et al. |
| 6,144,392 A | 11/2000 | Rogers |
| 6,150,610 A | 11/2000 | Sutton |
| 6,189,068 B1 | 2/2001 | Witt et al. |
| 6,192,073 B1 | 2/2001 | Reader et al. |
| 6,192,458 B1 | 2/2001 | Arimilli et al. |
| 6,208,361 B1 | 3/2001 | Gossett |
| 6,209,078 B1 | 3/2001 | Chiang et al. |
| 6,222,552 B1 | 4/2001 | Haas et al. |
| 6,230,254 B1 | 5/2001 | Senter et al. |
| 6,239,810 B1 | 5/2001 | Van Hook et al. |
| 6,247,094 B1 | 6/2001 | Kumar et al. |
| 6,252,610 B1 | 6/2001 | Hussain |
| 6,292,886 B1 | 9/2001 | Makineni et al. |
| 6,301,600 B1 | 10/2001 | Petro et al. |
| 6,314,493 B1 | 11/2001 | Luick |
| 6,317,819 B1 | 11/2001 | Morton |
| 6,351,808 B1 | 2/2002 | Joy et al. |
| 6,370,617 B1 | 4/2002 | Lu et al. |
| 6,437,789 B1 | 8/2002 | Tidwell et al. |
| 6,438,664 B1 | 8/2002 | McGrath et al. |
| 6,480,927 B1 | 11/2002 | Bauman |
| 6,490,654 B2 | 12/2002 | Wickeraad et al. |
| 6,496,902 B1 | 12/2002 | Faanes et al. |
| 6,499,090 B1 | 12/2002 | Hill et al. |
| 6,525,737 B1 | 2/2003 | Duluk, Jr. et al. |
| 6,529,201 B1 | 3/2003 | Ault et al. |
| 6,597,357 B1 | 7/2003 | Thomas |
| 6,603,481 B1 | 8/2003 | Kawai et al. |
| 6,624,818 B1 | 9/2003 | Mantor et al. |
| 6,631,423 B1 | 10/2003 | Brown et al. |
| 6,631,463 B1 | 10/2003 | Floyd et al. |
| 6,657,635 B1 | 12/2003 | Hutchins et al. |
| 6,658,447 B2 | 12/2003 | Cota-Robles |
| 6,674,841 B1 | 1/2004 | Johns et al. |
| 6,700,588 B1 | 3/2004 | MacInnis et al. |
| 6,715,035 B1 | 3/2004 | Colglazier et al. |
| 6,732,242 B2 | 5/2004 | Hill et al. |
| 6,809,732 B2 | 10/2004 | Zatz et al. |
| 6,812,929 B2 | 11/2004 | Lavelle et al. |
| 6,825,843 B2 * | 11/2004 | Allen et al. ................ 345/522 |
| 6,825,848 B1 | 11/2004 | Fu et al. |
| 6,839,062 B2 | 1/2005 | Aronson et al. |
| 6,862,027 B2 | 3/2005 | Andrews et al. |
| 6,891,543 B2 | 5/2005 | Wyatt |
| 6,915,385 B1 | 7/2005 | Leasure et al. |
| 6,944,744 B2 | 9/2005 | Ahmed et al. |
| 6,952,214 B2 | 10/2005 | Naegle et al. |
| 6,965,982 B2 | 11/2005 | Nemawarkar |
| 6,975,324 B1 | 12/2005 | Valmiki et al. |
| 6,976,126 B2 | 12/2005 | Clegg et al. |
| 6,978,149 B1 | 12/2005 | Morelli et al. |
| 6,978,457 B1 | 12/2005 | Johl et al. |
| 6,981,106 B1 | 12/2005 | Bauman et al. |
| 6,985,151 B1 | 1/2006 | Bastos et al. |
| 7,015,909 B1 * | 3/2006 | Morgan, III et al. ......... 345/426 |
| 7,031,330 B1 | 4/2006 | Bianchini, Jr. |
| 7,032,097 B2 | 4/2006 | Alexander et al. |
| 7,035,979 B2 | 4/2006 | Azevedo et al. |
| 7,148,888 B2 | 12/2006 | Huang |
| 7,151,544 B2 | 12/2006 | Emberling |
| 7,154,500 B2 | 12/2006 | Heng et al. |
| 7,159,212 B2 | 1/2007 | Schenk et al. |
| 7,185,178 B1 | 2/2007 | Barreh et al. |
| 7,202,872 B2 | 4/2007 | Paltashev et al. |
| 7,260,677 B1 | 8/2007 | Vartti et al. |
| 7,305,540 B1 | 12/2007 | Trivedi et al. |
| 7,321,787 B2 | 1/2008 | Kim |
| 7,334,110 B1 | 2/2008 | Faanes et al. |
| 7,369,815 B2 | 5/2008 | Kang et al. |
| 7,373,478 B2 | 5/2008 | Yamazaki |
| 7,406,698 B2 | 7/2008 | Richardson |
| 7,412,570 B2 | 8/2008 | Moll et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,564,460 B2 | 7/2009 | Boland et al. |
| 7,750,913 B1 * | 7/2010 | Parenteau et al. ............ 345/502 |
| 7,777,748 B2 | 8/2010 | Bakalash et al. |
| 7,852,341 B1 | 12/2010 | Rouet et al. |
| 7,869,835 B1 | 1/2011 | Zu |
| 8,020,169 B2 | 9/2011 | Yamasaki |
| 2001/0026647 A1 | 10/2001 | Morita |
| 2002/0116595 A1 | 8/2002 | Morton |
| 2002/0130874 A1 | 9/2002 | Baldwin |
| 2002/0144061 A1 | 10/2002 | Faanes et al. |
| 2002/0194430 A1 | 12/2002 | Cho |
| 2003/0001847 A1 | 1/2003 | Doyle et al. |
| 2003/0003943 A1 | 1/2003 | Bajikar |
| 2003/0014457 A1 | 1/2003 | Desai et al. |
| 2003/0016217 A1 | 1/2003 | Vlachos et al. |
| 2003/0016844 A1 | 1/2003 | Numaoka |
| 2003/0031258 A1 | 2/2003 | Wang et al. |
| 2003/0067473 A1 | 4/2003 | Taylor et al. |
| 2003/0172326 A1 | 9/2003 | Coffin, III et al. |
| 2003/0188118 A1 | 10/2003 | Jackson |
| 2003/0204673 A1 | 10/2003 | Venkumahanti et al. |
| 2003/0204680 A1 | 10/2003 | Hardage, Jr. |
| 2003/0227461 A1 | 12/2003 | Hux et al. |
| 2004/0012597 A1 * | 1/2004 | Zatz et al. ................... 345/501 |
| 2004/0073771 A1 | 4/2004 | Chen et al. |
| 2004/0073773 A1 | 4/2004 | Demjanenko |
| 2004/0103253 A1 | 5/2004 | Kamei et al. |
| 2004/0193837 A1 | 9/2004 | Devaney et al. |
| 2004/0205326 A1 | 10/2004 | Sindagi et al. |
| 2004/0212730 A1 | 10/2004 | MacInnis et al. |
| 2004/0215887 A1 | 10/2004 | Starke |
| 2004/0221117 A1 | 11/2004 | Shelor |
| 2004/0263519 A1 | 12/2004 | Andrews et al. |
| 2005/0012759 A1 | 1/2005 | Valmiki et al. |
| 2005/0024369 A1 | 2/2005 | Xie |

(56) References Cited

U.S. PATENT DOCUMENTS

| | | | |
|---|---|---|---|
| 2005/0071722 | A1 | 3/2005 | Biles |
| 2005/0088448 | A1 | 4/2005 | Hussain et al. |
| 2005/0239518 | A1 | 10/2005 | D'Agostino et al. |
| 2005/0262332 | A1 | 11/2005 | Rappoport et al. |
| 2005/0280652 | A1 | 12/2005 | Hutchins et al. |
| 2006/0020843 | A1 | 1/2006 | Frodsham et al. |
| 2006/0064517 | A1 | 3/2006 | Oliver |
| 2006/0064547 | A1 | 3/2006 | Kottapalli et al. |
| 2006/0103659 | A1 | 5/2006 | Karandikar et al. |
| 2006/0152519 | A1 | 7/2006 | Hutchins et al. |
| 2006/0152520 | A1 | 7/2006 | Gadre et al. |
| 2006/0176308 | A1 | 8/2006 | Karandikar et al. |
| 2006/0176309 | A1 | 8/2006 | Gadre et al. |
| 2007/0076010 | A1 | 4/2007 | Swamy et al. |
| 2007/0130444 | A1 | 6/2007 | Mitu et al. |
| 2007/0285427 | A1* | 12/2007 | Morein et al. ............... 345/501 |
| 2008/0016327 | A1 | 1/2008 | Menon et al. |
| 2008/0278509 | A1* | 11/2008 | Washizu et al. ............... 345/522 |
| 2009/0235051 | A1 | 9/2009 | Codrescu et al. |
| 2012/0023149 | A1 | 1/2012 | Kinsman et al. |

FOREIGN PATENT DOCUMENTS

| | | |
|---|---|---|
| JP | 08-297605 | 12/1996 |
| JP | H09-325759 | 12/1997 |
| JP | 10-222476 | 8/1998 |
| JP | 11-190447 | 7/1999 |
| JP | 2000-148695 | 5/2000 |
| JP | 2003-178294 | 6/2003 |
| JP | 2004-252990 | 9/2004 |
| TW | 413766 | 12/2000 |
| TW | 436710 | 5/2001 |
| TW | 442734 | 6/2001 |

OTHER PUBLICATIONS

Foley et al. Computer Graphics: Principles and Practice; Second Edition in C; pp. 866-867; Addison-Wesley 1997.*

Intel, Intel Architecture Software Deveopler's Manual, vol. 1: Basic Architecture 1997 p. 8-1.

Intel, Intel Architecture Software Deveopler's Manual, vol. 1: Basic Architecture 1999 p. 8-1, 9-1.

Intel, Intel Pentium III Xeon Processor at 500 and 550Mhz, Feb. 1999.

Free On-Line Dictionary of Computing (FOLDOC), defintion of "video", from foldoc.org/index.cgi?query=video&action=Search, May 23, 2008.

FOLDOC, definition of "frame buffer", from foldoc.org/index.cgi?query=frame+buffer&action=Search, Oct. 3, 1997.

PCreview, article entitled "What is a Motherboard", from www.pereview.co.uk/articles/Hardware/What_is_a_Motherboard., Nov. 22, 2005.

FOLDOC, definition of "motherboard", from foldoc.org/index.cgi?query=motherboard&action=Search, Aug. 10, 2000.

FOLDOC, definition of "separate compilation", from foldoc.org/index.cgi?query=separate+compilation&action=Search, Feb. 19, 2005.

FOLDOC, definition of "vector processor", http://foldoc.org/, Sep. 11, 2003.

Wikipedia, defintion of "vector processor", http://en.wikipedia.org/, May 14, 2007.

Fisher, Joseph A., Very Long Instruction Word Architecture and the ELI-512, ACM, 1993, pp. 140-150.

FOLDOC (Free On-Line Dictionary of Computing), defintion of X86, Feb. 27, 2004.

FOLDOC, definition of "superscalar," http://foldoc.org/, Jun. 22, 2009.

FOLDOC, definition of Pentium, Sep. 30, 2003.

Wikipedia, definition of "scalar processor," Apr. 4, 2009.

Intel, Intel MMX Technology at a Glance, Jun. 1997.

Intel, Pentium Processor Family Developer's Manual, 1997, pp. 2-13.

Intel, Pentium processor with MMX Technology at 233Mhz Performance Brief, Jan. 1998, pp. 3 and 8.

Wikipedia, entry page defining term "SIMD", last modified Mar. 17, 2007.

FOLDOC, Free Online Dictionary of Computing, defintion of SIMD, foldoc.org/index.cgi?query=simd&action=Search, Nov. 4, 1994.

Definition of "queue" from Free on-Line Dictionary of Computing (FOLDOC), http://folddoc.org/index.cgi?query=queue&action=Search, May 15, 2007.

Definition of "first-in first-out" from FOLDOC, http://foldoc.org/index.cgi?query=fifo&action=Search, Dec. 6, 1999.

Definition of "block" from FOLDOC, http://foldoc.org/index.cgi?block, Sep. 23, 2004.

Quinnell, Richard A. "New DSP Architectures Go "Post-Harvard" for Higher Performance and Flexibility" Techonline; posted May 1, 2002.

Wikipedia, definition of Multiplication, accessed from en.wikipedia.org/w/index.php?title=Multiplication&oldid=1890974, published Oct. 13, 2003.

IBM TDB, Device Queue Management, vol. 31 Iss. 10, pp. 45-50, Mar. 1, 1989.

Hamacher, V. Carl et al., Computer Organization, Second Edition, McGraw Hill, 1984, pp. 1-9.

Graham, Susan L. et al., Getting Up to Speed: The future of Supercomputing, the National Academies Press, 2005, glossary.

Rosenberg, Jerry M., Dictionary of Computers, Information Processing & Telecommunications, 2nd Edition, John Wiley & Sons, 1987, pp. 102 and 338.

Rosenberg, Jerry M., Dictionary of Computers, Information Processing & Telecommunications, 2nd Edition, John Wiley & Sons, 1987, pp. 305.

Graf, Rudolf F., Modern Dictionary of Electronics, Howard W. Sams & Company, 1988, pp. 273.

Graf, Rudolf F., Modern Dictionary of Electronics, Howard W. Sams & Company, 1984, pp. 566.

Wikipeida, definition of "subroutine", published Nov. 29, 2003, four pages.

Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.

SearchStorage.com Definitions, "Pipeline Burst Cache," Jul. 31, 2001, url: http://searchstorage.techtarget.com/sDefinition/0,,sid5_gci214414,00.html.

Parhami, Behrooz, Computer Arithmetic: Algorithms and Hardware Designs, Oxford University Press, Jun. 2000, pp. 413-418.

gDEBugger, graphicRemedy, http://www.gremedy.com, Aug. 8, 2006.

Duca et al., A Relational Debugging Engine for Graphics Pipeline, International Conference on Computer Graphics and Interactive Techniques, ACM SIGGRAPH 2005, pp. 453-463, ISSN:0730-0301.

NVIDIA Corporation, Technical Brief: Transform and Lighting; dated 1999; month unknown.

Gadre, S., Patent Application Entitled "Video Processor Having Scalar and Vector Components with Command FIFO for Passing Function Calls from Scalar to Vector", U.S. Appl. No. 11/267,700, filed Nov. 4, 2005.

Gadre, S., Patent Application Entitled "Stream Processing in a Video Processor", U.S. Appl. No. 11/267,599, filed Nov. 4, 2005.

Karandikar et al., Patent Application Entitled: "Multidemnsional Datapath Processing in a Video Processor", U.S. Appl. No. 11/267,638, filed Nov. 4, 2005.

Karandikar et al., Patent Application Entitled: "A Latency Tolerant System for Executing Video Processing Operations", U.S. Appl. No. 11/267,875, filed Nov. 4, 2005.

Gadre, S., Patent Application Entitled "Separately Schedulable Condition Codes for a Video Processor", U.S. Appl. No. 11/267,793, filed Nov. 4, 2005.

Lew, et al., Patent Application Entitled "A Programmable DMA Engine for Implementing Memory Transfers for a Video Processor", U.S. Appl. No. 11/267,777, filed Nov. 4, 2005.

(56) References Cited

OTHER PUBLICATIONS

Karandikar et al., Patent Application Entitled: "A Pipelined L2 Cache for Memory Transfers for a Video Processor", U.S. Appl. No. 11/267,606, filed Nov. 4, 2005.

Karandikar, et al., Patent Application Entitled: "Command Acceleration in a Video Processor", U.S. Appl. No. 11/267,640, filed Nov. 4, 2005.

Karandikar, et al., Patent Application Entitled "A Configurable SIMD Engine in a Video Processor", U.S. Appl. No. 11/267,393, filed Nov. 4, 2005.

Karandikar, et al., Patent Application Entitled "Context Switching on a Video Processor Having a Scalar Execution Unit and a Vector Execution Unit", U.S. Appl. No. 11/267,778, filed Nov. 4, 2005.

Lew, et al., Patent Application Entitled "Multi Context Execution on a Video Processor", U.S. Appl. No. 11/267,780, filed Nov. 4, 2005.

Su, Z, et al., Patent Application Entitled: "State Machine Control for a Pipelined L2 Cache to Implement Memory Transfers for a Video Processor", U.S. Appl. No. 11/267,119, filed Nov. 4, 2005.

Kozyrakis, "A Media enhanced vector architecture for embedded memory systems," Jul. 1999, http://digitalassets.lib.berkeley.edu/techreports/ucb/text/CSD-99/1059.pdf.

HPL-PD A Parameterized Research Approach—May 31, 2004 http://web.archive.org/web/*/www.trimaran.org/docs/5_hpl-pd.pdf.

Heirich; Optimal Automatic Mulit-pass Shader Partitioning by Dynamic Programming; Eurographics—Graphics Hardware (2005); Jul. 2005.

Brown, Brian; "Data Structure and Number Systems"; 2000; http://www.ibilce.unesp.br/courseware/datas/data3.htm.

Hutchins E., SC10: A Video Processor and Pixel-Shading GPU for Handheld Devices; presented at the Hot Chips conferences on Aug. 23, 2004.

Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.

Woods J., Nvidia GeForce FX Preview, at http://www.tweak3d.net/reviews/nvidia/nv30preview/1.shtml; dated Nov. 18, 2002; retrieved Jun. 16, 2011.

\* cited by examiner

System 100

Register Packet 500

SOFTWARE ASSISTED SHADER MERGING

CROSS REFERENCE TO RELATED APPLICATIONS

This Application is related to the following U.S. Patent Applications:
"A PROGRAM SEQUENCER FOR GENERATING INDETERMINANT LENGTH SHADER PROGRAMS FOR A GRAPHICS PROCESSOR", by Mahan et al., filed on Aug. 15, 2007, Ser. No. 11/893,404; "FRAGMENT SPILL/RELOAD FOR A GRAPHICS PROCESSOR", by Mahan et al., filed on Aug. 15, 2007, Ser. No. 11/893,502; "SHADER PROGRAM INSTRUCTION FETCH", by Mahan et al., filed on Aug. 15, 2007, Ser. No. 11/893,503; and "SOFTWARE ASSISTED SHADER MERGING", by Mahan et al., filed on Aug. 15, 2007, Ser. No. 11/893,439.

FIELD OF THE INVENTION

The present invention is generally related to programming graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data. Generally, the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

In modern real-time 3-D graphics rendering, the functional units of the GPU need to be programmed in order to properly execute many of the more refined pixel shading techniques. These techniques require, for example, the blending of colors into a pixel in accordance with factors in a rendered scene which affect the nature of its appearance to an observer. Such factors include, for example, fogginess, reflections, light sources, and the like. In general, several graphics rendering programs (e.g., small specialized programs that are executed by the functional units of the GPU) influence a given pixel's color in a 3-D scene. Such graphics rendering programs are commonly referred to as shader programs, or simply shaders. In more modern systems, some types of shaders can be used to alter the actual geometry of a 3-D scene (e.g., Vertex shaders) and other primitive attributes.

In a typical GPU architecture, each of the GPU's functional units is associated with a low level, low latency internal memory (e.g., register set, etc.) for storing instructions that programmed the architecture for processing the primitives. The instructions typically comprise a shader programs and the like. The instructions are loaded into their intended GPU functional units by propagating them through the pipeline. As the instructions are passed through the pipeline, when they reach their intended functional unit, that functional unit will recognize its intended instructions and store them within its internal registers.

Prior to being loaded into the GPU, the instructions are typically stored in system memory. Because the much larger size of the system memory, a large number of shader programs can be stored there. A number of different graphics processing programs (e.g., shader programs, fragment programs, etc.) can reside in system memory. The programs can each be tailored to perform a specific task or accomplish a specific result. In this manner, the graphics processing programs stored in system memory act as a library, with each of a number of shader programs configured to accomplish a different specific function. For example, depending upon the specifics of a given 3-D rendering scene, specific shader programs can be chosen from the library and loaded into the GPU to accomplish a specialized customized result.

The graphics processing programs, shader programs, and the like are transferred from system memory to the GPU through a DMA (direct memory access) operation. This allows GPU to selectively pull in the specific programs it needs. The GPU can assemble an overall graphics processing program, shader, etc. by selecting two or more of the graphics programs in system memory and DMA transferring them into the GPU.

There are problems with conventional GPU architectures in selectively assembling more complex graphics programs, shader programs, or the like from multiple subprograms. In general, it is advantageous to link two or more graphics programs together in order to implement more complex or more feature filled render processing. A problem exists however, in that in order to link multiple graphics processing programs together, the addressing schemes of the programs need to properly refer to GPU memory such that the two programs execute as intended. For example, in a case where two shader programs are linked to form a longer shader routine, the first shader address mechanism needs to correctly reference the second shader address mechanism. Additionally, both shader address mechanisms need to properly and coherently referred to the specific GPU functional units and/or registers in which they will be stored. This can involve quite a bit of overhead in those cases where there are many different graphics programs stored in system memory and a given application wants to be able to link multiple programs in a number of different orders, combinations, total lengths, and the like.

The programs in system memory have no way of knowing the order in which they will be combined, the number of them there will be in any given combination, or whether they will be combined at all. Due to the real time rendering requirements, the configurations of the combinations need to be determined on-the-fly, and need to be implemented as rapidly as possible in order to maintain acceptable frame rates. It is still desirable to DMA transfer the programs from the system memory to the GPU (e.g., on an as-needed basis). In order to facilitate DMA transfers, the desired programs need to be modified to properly point to their respective correct addresses and to properly order themselves for execution with the various functional units of the GPU. Unfortunately, this results in a large number of read-modify-write operations (e.g., R-M-W), where the program must be read, their address mechanisms altered such that the individual instructions comprising each program correctly match their intended functional units and registers, and written back to system memory. Only after the required R-M-W operations have been completed can the desired programs be DMA transferred into the GPU. This results in a large amount of undesirable processor overhead.

The increased overhead proves especially problematic with the ability of prior art 3-D rendering architectures to scale to handle the increasingly complex 3-D scenes of today's applications. Scenes now commonly contain hundreds of programs each consisting of up to hundreds of instructions. Thus, a need exists for program loading process that can scale as graphics application needs require and provide added performance without incurring penalties such as increased processor overhead.

Moreover, different operations or programs within a graphics pipeline may originate from different sources. For example, a traditional graphics pipeline may involve multiple application programmatic interfaces (APIs), with separate APIs being used for interacting with shader modules and the raster operation modules. With different APIs, and often different underlying sources of graphics data, read-modify-write hazards are created. For example, a change to one program currently operating on the graphics pipeline may unintentionally overwrite portions of a second program, while the second program is still in use.

SUMMARY OF THE INVENTION

Embodiments for programming a graphics pipeline, and modules within the graphics pipeline, are detailed herein. These embodiments address the need for allowing multiple shader programs to be merged into the same instruction table, while avoiding read-modify-write hazards. Several of these embodiments utilize offset registers associated with the instruction tables for the modules within the pipeline. The offset register serves as a pointer to locations in the instruction table, which allows instructions to be written to the instruction table, without requiring that the shader programs have explicit addresses.

One embodiment described a method of implementing software assisted shader merging for a graphics pipeline. The method involves accessing a first shader program in memory, and generating a first shader instruction from that program. This first instruction is loaded into an instruction table at a first location, indicated by an offset register. A second shader program in memory is then accessed, and used to generate a second shader instruction. The second shader instruction is loaded into the instruction table at a second location indicated by the offset register.

Another embodiment describes a graphics processing unit (GPU). The GPU includes an integrated circuit die, made up of a number of stages of the GPU, as well as a memory interface for interfacing with the graphics memory, and a host interface for interfacing with a computer system. The stages of the GPU make up a graphics pipeline, which is configured to access a first shader program stored in memory. A shader instruction is generated from his first shader program, and loaded into an instruction table at a location indicated by an offset register. The pipeline is also configured to access a second shader program, which is used to generate another shader instruction, which is loaded into the instruction table at another location indicated by the offset register.

Another embodiment describes a handheld computer system device. The device is made up of system memory, a central processing unit (CPU), and a graphics processing unit (GPU). The GPU includes a graphics pipeline, which is configured to access a shader program stored in memory, generate a shader instruction from the shader program, and load the instruction into a location in an instruction table indicated by an offset register. The graphics pipelines further configured to access another shader program, generate a second shader instruction from this second shader program, and load the second instruction into another location in the instruction table, as indicated by the offset register.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Figure 1:
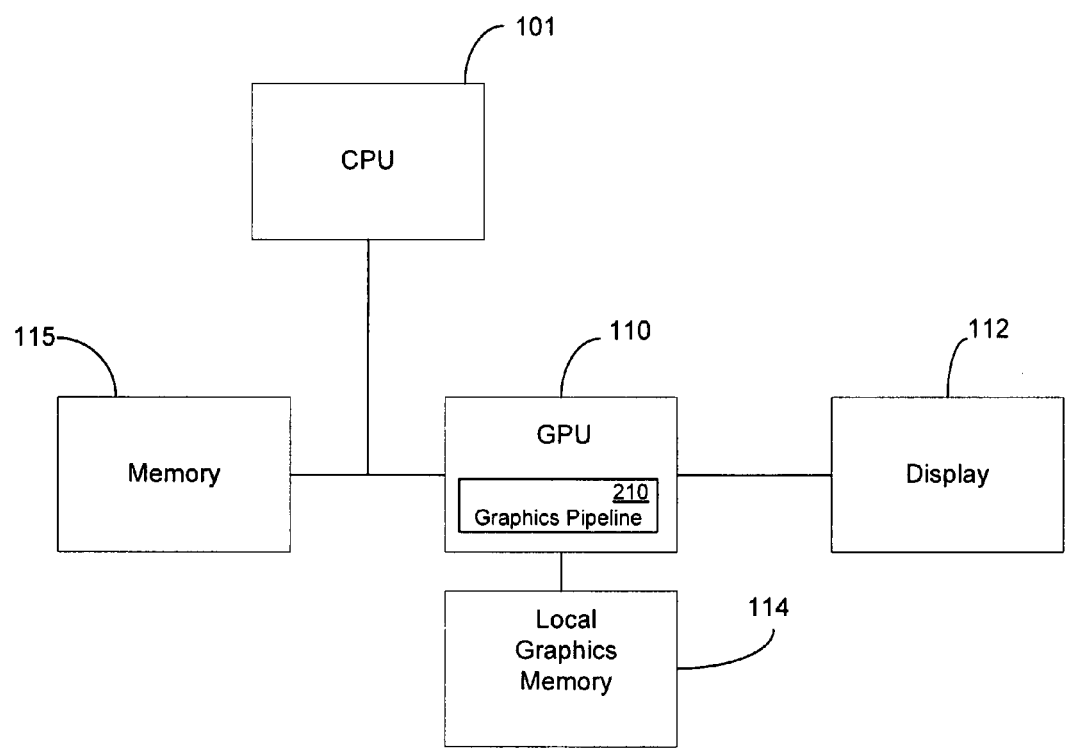
FIG. 1 shows a computer system in accordance with one embodiment of the present invention.

FIG. 1 shows a computer system 100 in accordance with one embodiment of the present invention. The depicted computer system includes the components of a basic computer system in accordance with embodiments of the present invention providing the execution platform for certain hardware-based and software-based functionality. In general, the computer system comprises at least one CPU 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to the system to further increase its computational power. The GPU(s) is coupled to the CPU and the system memory. The system can be implemented as, for example, a desktop computer system or server computer system, having a powerful general-purpose CPU coupled to a dedicated graphics rendering GPU. In such an embodiment, components can be included that add peripheral buses, specialized graphics memory, IO devices, and the like. Similarly, the system can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU can be implemented as a discrete component, a discrete graphics card designed to couple to the computer system via a connector (e.g., AGP slot, PCI-Express slot, etc.), a discrete integrated circuit die (e.g., mounted directly on a motherboard), or as an integrated GPU included within the integrated circuit die of a computer system chipset component (not shown), or within the integrated circuit die of a PSOC (programmable system-on-a-chip). Additionally, a local graphics memory 114 can be included for the GPU for high bandwidth graphics data storage. The GPU is depicted as including pipeline 210, which is described in greater detail below, with reference to FIGS. 2 through 5.

Figure 2:
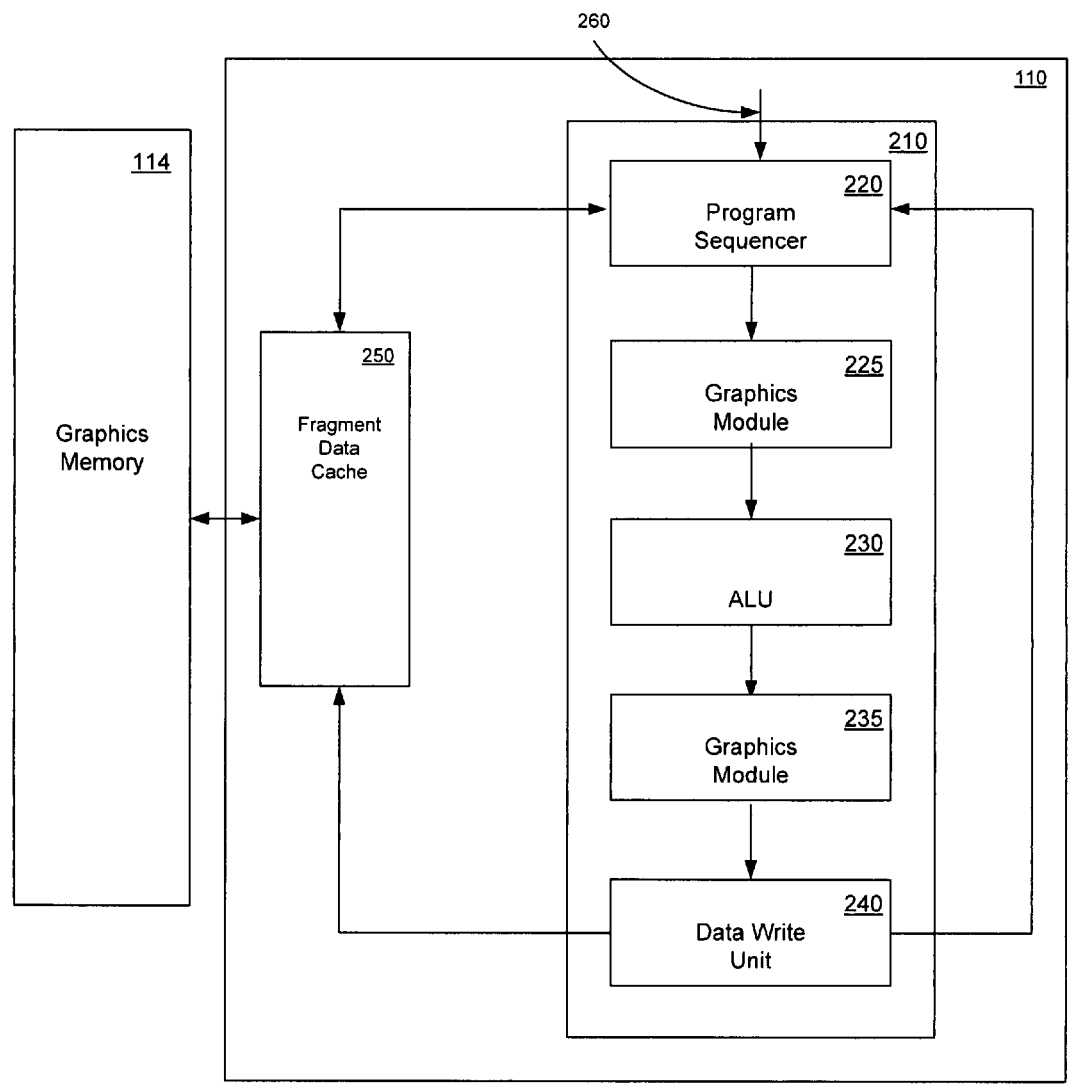
FIG. 2 shows a diagram illustrating internal components of a GPU and a graphics memory in accordance with one embodiment of the present invention.

FIG. 2 shows internal components of the GPU and the graphics memory in accordance with one embodiment of the present invention. As depicted in FIG. 2, the GPU 110 includes a graphics pipeline 210 and a fragment data cache 250 which couples to the graphics memory 114.

As depicted in FIG. 2, the graphics pipeline includes a number of functional modules. Several such functional modules have been illustrated, e.g., program sequencer 220, graphics module 225, ALU 230, graphics module 235, and data write component 240. The functional modules included in the graphics pipeline operate by rendering graphics primitives that are received from a graphics application, e.g., from a graphics driver. In the depicted embodiment, the functional modules access information for rendering the pixels related to the graphics primitives via the fragment data cache 250. The fragment data cache operates as a high-speed cache for information stored in the graphics memory, e.g., the frame buffer memory.

In some embodiments, the graphics pipeline may be utilized for other, non-graphics purposes. For example, the graphics pipeline, and the GPU, may be utilized to implement general-purpose GPU operations, e.g., physical simulation, such as the draping of cloth across an object, can be calculated using graphics hardware such as the GPU and the graphics pipeline. While embodiments below are described in terms of operating on graphics primitives, it is understood that other embodiments are well suited to applications involving non-graphics oriented applications.

The program sequencer functions by controlling the operation of the functional modules of the graphics pipeline. The program sequencer can interact with the graphics driver (e.g., a graphics driver executing on the CPU) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input functions as the main fragment data pathway, or pipeline, between the functional modules of the graphics pipeline. Primitives are generally received at the "top" of the pipeline and are progressively rendered into resulting rendered pixel data as they proceed from one module to the next along the pipeline.

In one embodiment, data proceeds between the various functional modules in a packet based format. For example, the graphics driver transmits data to the GPU in the form of data packets are specifically configured to interface with and be transmitted along the fragment pipe communications pathways of the pipeline. Such data packets may include pixel packets or register packets. The pixel packets generally includes information regarding a group or tile of pixels (e.g., 4 pixels, 8 pixels, 16 pixels, etc.) and coverage information for one or more primitives that relate to the pixels. The register packets can include configuration information that enables the functional modules of the pipeline to configure themselves for rendering operations. For example, the register packets can include configuration bits, instructions, functional module addresses, etc. that that can be used by one or more of the functional modules of the pipeline to configure itself for the current rendering mode, or the like. In addition to pixel rendering information and functional module configuration information, the data packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In some embodiments, pixel packets may make multiple passes through the graphics pipeline. For example, as a packet is processed through the graphics pipeline, some of the instructions in a particular functional module may be performed on that packet during an initial pass, and additional instructions may be performed during a subsequent pass. In the depicted embodiment, if a packet is to pass through the graphics pipeline an additional time, it is returned to the program sequencer, which may pass it through the graphics pipeline for additional processing. In another embodiment, the data write unit may pass the partially-processed data packet to the fragment data cache, and the program sequencer may retrieve the packet for additional processing. As is explained below, some embodiments utilize this approach to enable additional instructions to be loaded into the graphics pipeline modules.

In some embodiments, as noted above, such shader program instructions are passed as packets through the graphics pipeline, and loaded into one or more designated functional modules. One such embodiment "labels" instruction packets to identify which functional module or modules should utilize the instructions contained therein, e.g., by including a register address or pointer in the packet header, indicating which instruction table the instruction packet is intended for. For example, as an instruction packet passes through a functional module, one of three possible results may occur, based upon the header for the packet: the packet is not intended for that module, and so the module ignores the packet and passes it along the graphics pipeline; the packet is intended solely for that module, and so the module utilizes the instructions contained therein, and "consumes" the packet, not passing it down the graphics pipeline; or the packet is intended for several modules, including the current module, and so the module utilizes the instructions contained therein, and passes the packet down the graphics pipeline.

In one embodiment, the GPU stores the span of pixels in graphics memory subsequent to program execution for the first portion. This clears the stages of the pipeline to be used for loading instructions for the second portion. Subsequent to loading instructions from the second portion, the GPU accesses the span of pixels in the graphics memory to perform program execution for the second portion. In this manner, the program sequencer loads the first portion of the shader program, processes the span of pixels in accordance with the first portion, temporarily stores the intermediate result in the graphics memory, loads the second portion of the shader program, retrieves the intermediate results from the graphics memory and processes the span of pixels (e.g., the intermediate results) in accordance with the second portion. This process can be repeated until all portions of an indeterminate length shader program have been executed and the span of pixels have been complete a processed. The resulting processed pixel data is then transferred to the graphics memory for rendering onto the display.

Several embodiments combine the use of instruction packets with the storing/reloading of intermediate results to reprogram the graphics pipeline part way through processing a span of pixels. As is explained in greater detail below, the graphics pipeline can be "cleared" through the use of a spill/reload operation, allowing instruction packets to pass between functional modules. In this manner, the highly optimized and efficient fragment pipe communications pathway implemented by the functional modules of the graphics pipeline can be used not only to transmit pixel data between the functional modules, but to also transmit configuration information and shader program instructions between the functional modules.

Referring still to FIG. 2, in the present embodiment, the program sequencer functions by controlling the operation of the other components of the graphics pipeline and working in conjunction with the graphics driver to implement a method for loading and executing an indeterminate length shader program. As used herein, the term "indefinite length" or "indeterminate length" shader program refers to the fact that the shader programs that can be executed by the GPU are not arbitrarily limited by a predetermined, or format based, length. Thus for example, shader programs that can be executed can be short length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc) or the like.

To execute shader programs of indeterminate length, the program sequencer controls the graphics pipeline to execute such indeterminate length shader programs by executing them in portions. The program sequencer accesses a first portion of the shader program from the system memory 114 and loads the instructions from the first portion into the plurality of stages of the pipeline (e.g., the ALU, the data write component, etc.) of the GPU to configure the GPU for program execution. As described above, the instructions for the first portion can be transmitted to the functional modules of the graphics pipeline as pixel packets that propagate down the fragment pipeline. A span of pixels (e.g., a group of pixels covered by a primitive, etc.) is then processed in accordance with the instructions from the first portion. A second portion of the shader program is then accessed (e.g., DMA transferred in from the system memory) and instructions from the second portion are then loaded into the plurality of stages of the pipeline.

The span of pixels is then processed in accordance with the instructions from the second portion. In this manner, multiple shader program portions can be accessed, loaded, and executed to perform operations on the span of pixels. For example, for a given shader program that comprises a hundred or more portions, for each of the portions, the GPU can process the span of pixels by loading instructions for the portion and executing instructions for that portion, and so on until all the portions comprising the shader program are executed. This attribute enables embodiments of the present invention to implement the indefinite length shader programs. As described above, no arbitrary limit is placed on the length of a shader program that can be executed.

Figure 3:
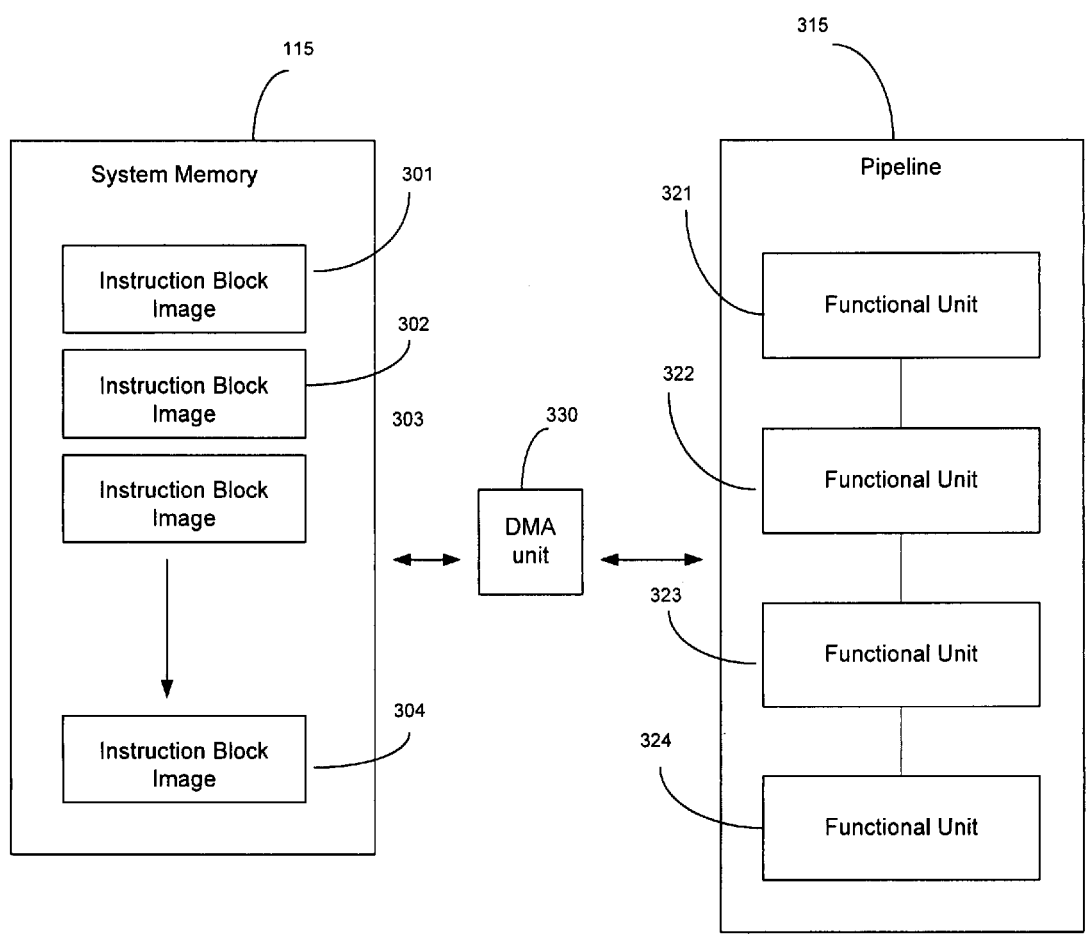
FIG. 3 shows a diagram of a system memory and a plurality of functional modules of a graphics pipeline in accordance with one embodiment of the present invention.

FIG. 3 shows a diagram of the system memory 115 and a plurality of functional modules 321-324 of a graphics pipeline 315 in accordance with one embodiment of the present invention. As depicted in FIG. 3, the system memory includes a plurality of instruction block images 301-304. These instruction block images are basically small shader programs that can be assembled, using two or more such small shader programs, into a large share program. In this manner, the instruction block images can be viewed as portions of a large shader program, as described above. A portion of a shader program is at times referred to as an epoch.

The functional modules are typical functional modules of the 3-D graphics rendering pipeline (e.g., setup unit, raster unit, texturing unit, etc.). The 3-D graphics rendering pipeline comprises a core component of a GPU, and can be seen as more basic diagram of the pipeline 210 from FIG. 2. The FIG. 3 embodiment shows the plurality of instruction block images that can be DMA transferred into the pipeline for use by one or more of the functional modules. The instruction block images are configured to implement particular graphics rendering functions. In one embodiment, they are stored within the system memory and are DMA transferred, via the DMA unit 330, when they are needed to perform graphics rendering operations on a span of pixels (e.g., being rendered on the GPU).

Each of the instruction block images comprise a graphics rendering epoch that programs the hardware components of, for example, a functional unit 322 (e.g., an ALU unit, etc.) to perform a graphics rendering operation. A typical instruction block image (e.g., instruction block image 301) comprises a number of instructions. In the DMA transfer embodiment described above, the instruction block images are stored in system memory and are maintained there until needed by a graphics application executing on the GPU.

The FIG. 3 embodiment indicates that a large number of instruction block images can be stored within the system memory (e.g., 50 instruction block images, 200 instruction block images, or more). The large number of different instruction block images allows flexibility in fashioning specific graphics rendering routines that are particularly suited to the needs of a graphics application. For example, indeterminate length complex rendering routines can be fashioned by arranging multiple smaller rendering programs to execute in a coordinated fashion (e.g., arranging two or more shader programs to execute sequentially one after the other).

Additional details regarding the DMA transfer of instruction block images/portions and their assembly to create shader programs can be found in the commonly assigned United States patent application "Address independent shader program loading" by Mahan, et al., filed on Aug. 15, 2007, application Ser. No. 11/893,427, which is incorporated herein in its entirety.

Instruction Tables and Offset Registers

Figure 4:
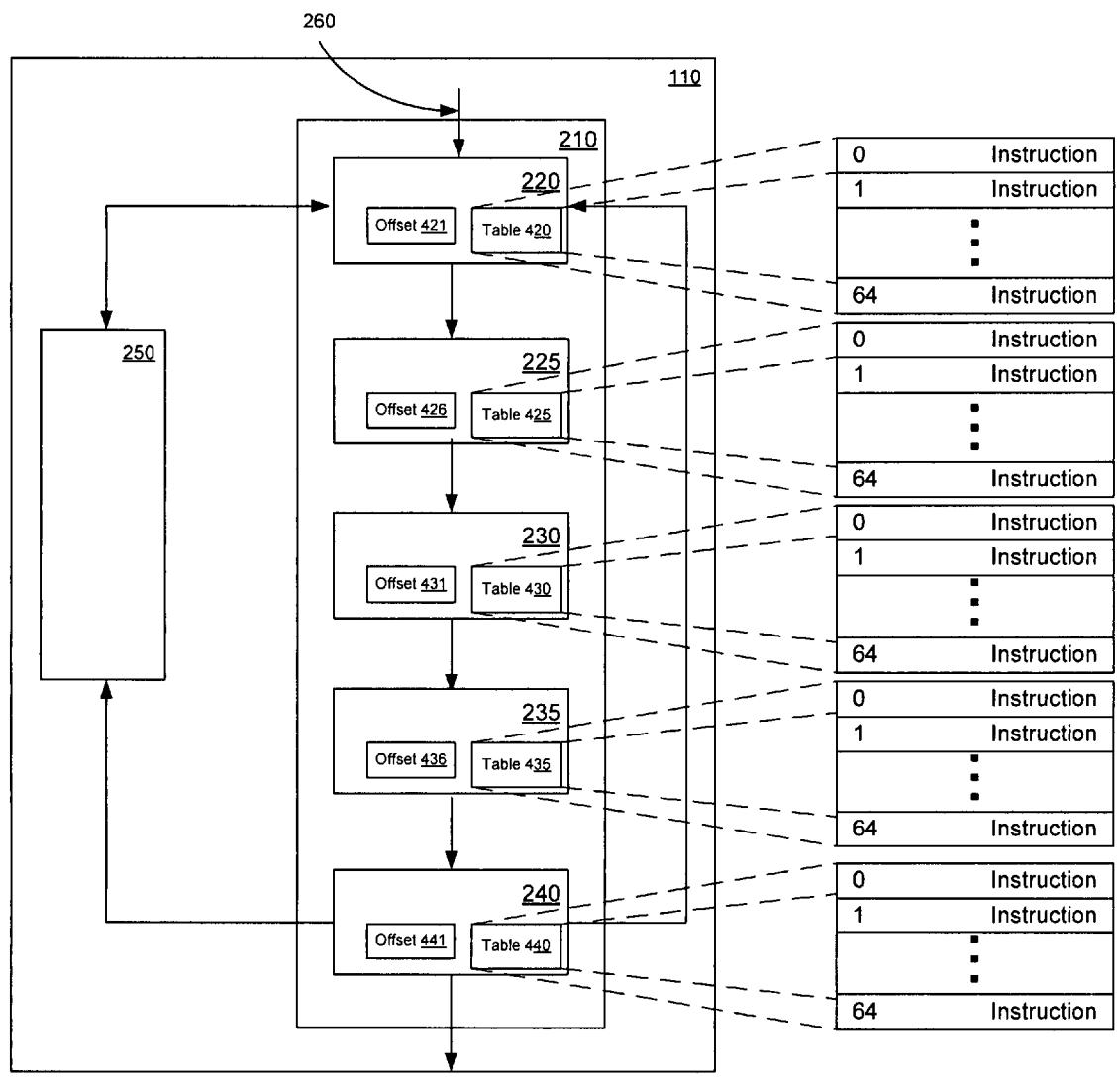
FIG. 4 shows a diagram illustrating internal components of a GPU, including instruction tables for functional modules with associated offset registers, in accordance with one embodiment of the present invention.

With reference now to FIG. 4, a graphics processing unit (GPU) 110 is depicted, according to one embodiment. In the depicted embodiment, the GPU includes graphics pipeline 210, as well as fragment data cache (FDC) 250. In FIG. 4, the graphics pipeline is made up of a number of functional modules 220, 225, 230, 235, and 240. Each of these functional modules includes an instruction table. In operation, these instruction tables would be loaded with operations to be performed upon a data packet, e.g., a packet of pixel data, in accordance with an overarching program, e.g., a shader program.

In the depicted embodiment, each functional module is associated with an instruction table. For example, program sequencer 220 is associated with command table 420. For such an embodiment, the instruction table contains instructions for the module on what actions to perform, or how to handle and manipulate data. For example, the command table may contain instructions for the program sequencer on where to locate shader program instruction sets, or how to configure other modules within the pipeline. In the depicted embodiment, instruction tables within the pipeline are 64 entries in length; is understood that the length of instruction tables in a very, across different embodiments, an embodiment so well suited to applications involving instruction tables of different sizes. Moreover, while FIG. 4 depicts an embodiment where all instruction tables are of similar length, other embodiments are well suited to applications involving different configurations of instruction tables. For example, in one embodiment, remap tables are utilized, such that a single entry in an instruction table may reference multiple instructions stored in another table.

In the depicted embodiment, an offset register is associated with each instruction table. The offset register is used as a pointer to a location within its associated instruction table, such that a new instruction received by a particular module, e.g., as a register packet, is loaded into the module's instruction table at the position indicated by the offset. The use of the offset register, in these embodiments, allows for new instructions to be inserted into the instruction table, without requiring that the underlying program or instructions contain the instruction table offset. Accordingly, modules within the pipeline can be programmed, with reference to this offset register, and without requiring that a shader program be compiled or patched whenever the contents or ordering of the instruction table is modified. For example, offset register 421 is associated with the command table of the program sequencer, and may indicate the first unused entry in the command table.

Similarly, module 225 is associated with table 425, with corresponding offset register 426. Module 230 is associated with table 430, with corresponding offset register 431. Module 235 is associated with table 435, with corresponding offset register 436. Module 240 is associated with table 440, with corresponding offset register 436.

Also, in some embodiments, a global offset register (not pictured) is maintained for the graphics pipeline. In several such embodiments, the global offset register is an alias for the offset registers of each of the modules within the pipeline. This offers several advantages: first, all of the offset registers within the pipeline may be modified, by altering the current value of the global offset register; and second, if a register packet is intended for use by all of the modules within the pipeline, it can be directed at the global offset register, rather than an offset register specific to one or another of the modules.

Register Packet Generation

Figure 5:
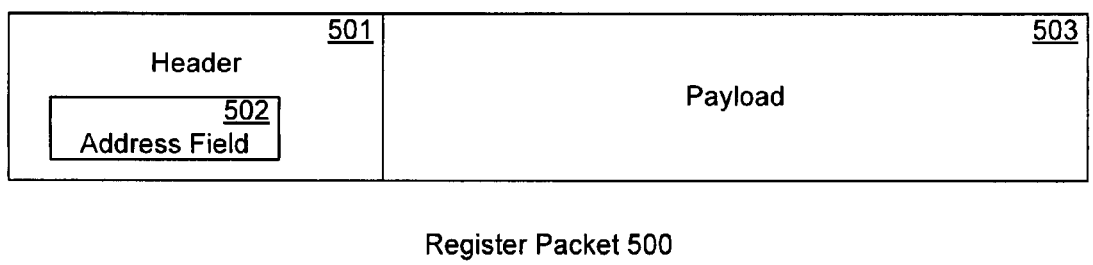
FIG. 5 is a diagram of a register packet, in accordance with one embodiment of the present invention.

With reference now to FIG. 5, an exemplary register packet 500 is depicted, in accordance with one embodiment. While this exemplary packet is shown as incorporating specific, enumerated features and elements, it is understood that embodiments are well suited to applications involving additional, fewer, or different features, elements, or arrangements.

One of the operations of the program sequencer is the generation of register packets. As noted previously, register packets are specialized data packets, which are passed down the graphics pipeline, and used to program or configure the modules within the pipeline, e.g., by loading instructions into a module's instruction table. One source of instructions may be an instruction block retrieved from system memory, e.g., as shown in FIG. 3.

In several embodiments, the instruction blocks which make up a shader program are processed by the program sequencer, and used to generate register packets. If a register packet may be made up of a header section 501 and a payload section 503. The header section may contain a variety of information, and will typically include an address field 502. The address field indicates which module or modules this particular register packet is intended for; e.g., a register packet intended for the ALU may have a different address entry than a packets intended for the data right unit, while a register packets intended for global application throughout the graphics pipeline may have still another address entry. The payload of a register packet is typically the instruction intended to be loaded into the consuming module; indeed depicted embodiment, the payload portion of the register packet is shown as being 32 bits wide. It is understood that, across different embodiments, the contents of the register packet, as well as the size and contents of any field within the packet, may vary.

Loading Instructions

Figure 6:
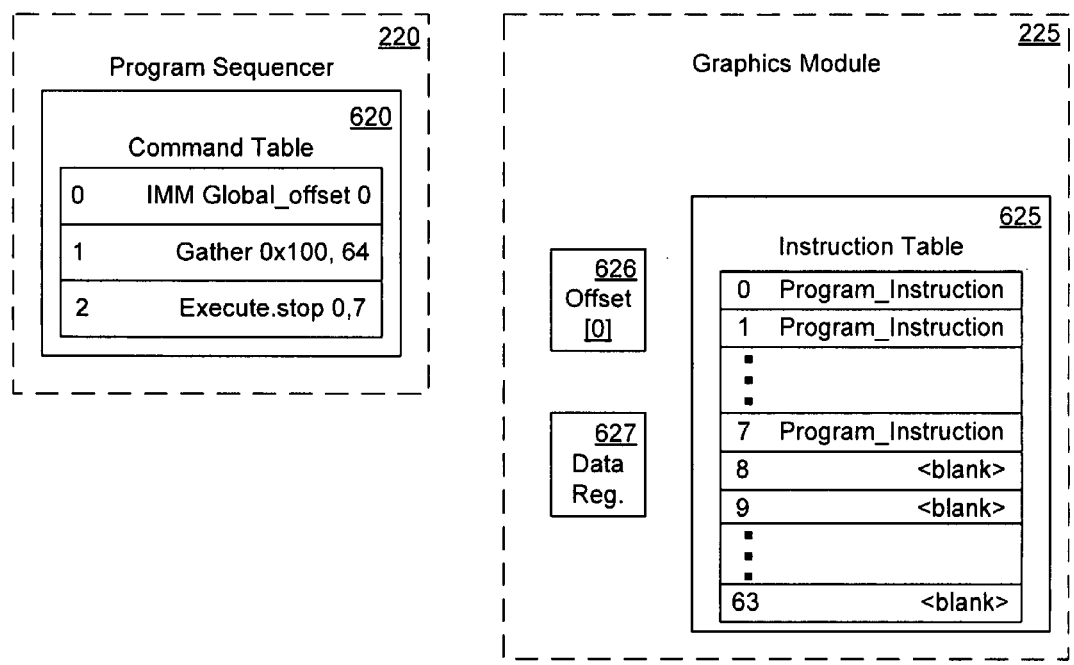
FIG. 6 is an illustration of loading instructions into an instruction table, in accordance with one embodiment of the present invention.

With reference now to FIG. 6, a process of loading instructions into an instruction table is depicted, in accordance with one embodiment. In the depicted embodiment, the command table 620, associated with the program sequencer in a graphics pipeline, has been loaded with several command instructions. As the program sequencer carries out these command instructions, it may generate register packets, which will then alter the state of instruction table 625, which is associated with the graphics module 225.

The command table is loaded with a number of command instructions. In different embodiments, these command instructions may have different sources; in one embodiment, for example, a GPU driver executing on a host computer may pass these command instructions to a GPU, and hence to the graphics pipeline and the program sequencer.

Command instruction 0, in the depicted embodiment, is flagged as an "immediate" instruction; the presence of the immediate opcode in an instruction, in this embodiment, indicates that the data for the instruction is located in the instruction itself, as opposed to in memory or in a nearby register. Here, command instruction 0 tells the program sequencer to set the value of the global offset to zero. As described above, some embodiments utilize a global offset value, which aliases to the individual offsets used by each module throughout the pipeline. By initializing the global offset to zero, each offset associated with a module in the pipeline is similarly set to zero. In the depicted embodiment, this has the effect of resetting the pointer for table 625 to point to the first entry in the table; any instructions written to this table therefore be written beginning at position 0.

Command instruction 1, in the depicted embodiment, is a "gather" operation. A gather operation instructs the program sequencer to access a location in memory, e.g., graphics memory, and "read" a specified quantity of data stored at that location. Here, the program sequencer is instructed to access memory location 0x100, and read 64 words of data from that location. In some embodiments, such as the depicted embodiment, a gather operation is used to point the program sequencer at the location of instruction blocks; the program sequencer can then retrieve the instruction blocks, and generate the appropriate register packets.

Once the program sequencer has generated a register packet, the packet is passed down the pipeline. If a register packet is intended for a particular module, that module will recognize the address entry in the register packet. The module will then take the contents of the payload of the register packets, and load them into an associated data register, e.g., data register 627. The module will then attempt to write the contents of the data register to the position in its associated instruction table indicated by the associated offset register value. Here, for example, module 225 will recognize a register packet generated by the program sequencer. Module 225 will extract the payload of the register packet, and load it into the data register. The contents of the data register will then be written to instruction table 625 beginning from the position indicated by offset register 626. As entries are written to the instruction table, the value in the offset register may be incremented, such that the offset points to the next available location in the instruction table.

Once the program sequencer has finished gathering the indicated data, and generating any appropriate register packets, command instruction 2 from the command table is performed. In the depicted embodiment, command instruction 2 is an "execute.stop" instruction. In the depicted embodiment, an execute.stop instruction indicates to the program sequencer that, upon receipt of data to be processed, the data packets should be passed through the pipeline where instructions ranging from a first value through a second value in each instruction table should be performed. Here, a pixel packet received by the program sequencer would have a sequence value in the header initialized to the first indicated value, 0, and as operations are performed on the pixel packet, the sequence value would be incremented. Once the sequence value reaches the second indicated value, 7, no further operations would be performed on the pixel packet. In summary, command instruction 2 instructs the program sequencer and the graphics pipeline to perform an eight instruction program, beginning at instruction 0 and ending at instruction 7, and then halt operations until additional data packets are received for processing.

Program Instruction Fetch

Figure 7:
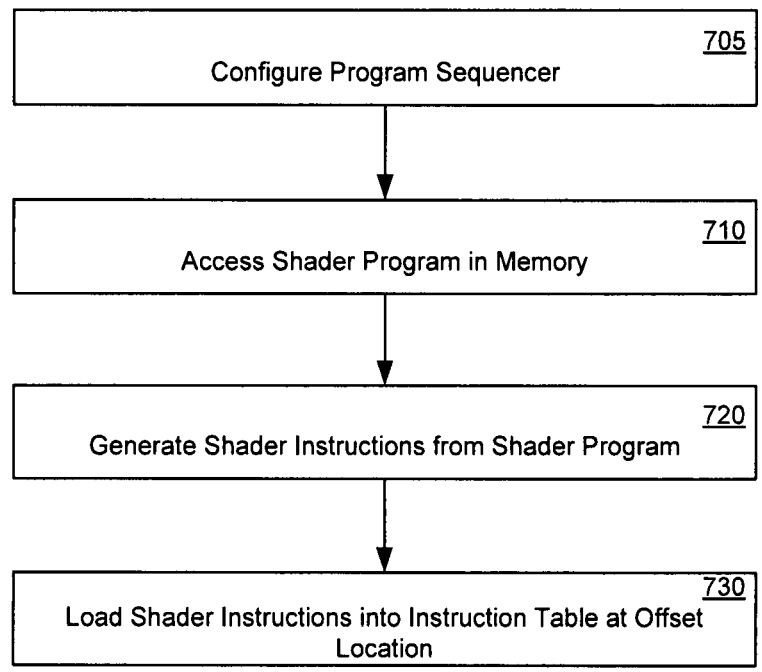
FIG. 7 is a flowchart of a method of programming a graphics pipeline, in accordance with one embodiment of the present invention.

With reference now to FIG. 7, a flowchart 700 of a method of programming a graphics pipeline is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 705, a program sequencer in a graphics pipeline is configured. In various embodiments, as noted previously, the method and approach of configuring the program sequencer may vary. For example, in one embodiment, a GPU driver issues a series of command instructions to the program sequencer, which configure the program sequencer to control the graphics pipeline. In one such embodiment, a series of command instructions are loaded into a command table associated with the program sequencer; these command instructions control the operation of the program sequencer, which in turn governs the flow of data to the graphics pipeline.

With reference now to step 710, a shader program stored in memory is accessed. In some embodiments, shader programs are made up of multiple instruction blocks, and stored in memory, e.g., graphics memory or system memory. The instruction blocks are made up of instructions intended for modules within the graphics pipeline. These instructions configure the various modules perform certain tasks on data packets being passed through the pipeline. These instruction blocks are retrieved, e.g., by the program sequencer carrying out a gather operation.

With reference now to step 720, shader instructions are generated from the shader program. As noted previously, in some embodiments, shader programs are made up of a collection of instruction blocks, which in turn are made up of individual instructions. In some embodiments, instructions may be read, one of the time, directly from memory; in another embodiment, individual instructions may need to be derived, e.g., by the program sequencer, from the shader program.

With reference now to step 730, shader instructions are loaded into an instruction table for a pipeline module at locations indicated by an offset register. As described previously, some embodiments utilize an offset register as a "pointer." The value contained in the offset register indicates a position within the instruction table for the related module where instructions should be loaded. In one such embodiment, the program sequencer generates register packets, which contain one or more instructions intended for a particular module. The module recognizes the register packet, e.g., by reading an address field included in the header of the packet, and extracts the instructions contained therein. These instructions are then loaded into the instruction table for the module, beginning at the position indicated by the offset register. As such, the shader instructions can be passed to their intended destination and utilized by the appropriate module, without the need for the shader program to include specific instruction table offsets.

Software Assisted Shader Program Merging

In some embodiments, the above approach is utilized to allow multiple shader programs to be "merged" into the same instruction table. In this way, these embodiments address the problem described previously, in which multiple sources of shader programs may generate programs independently.

Figure 8:
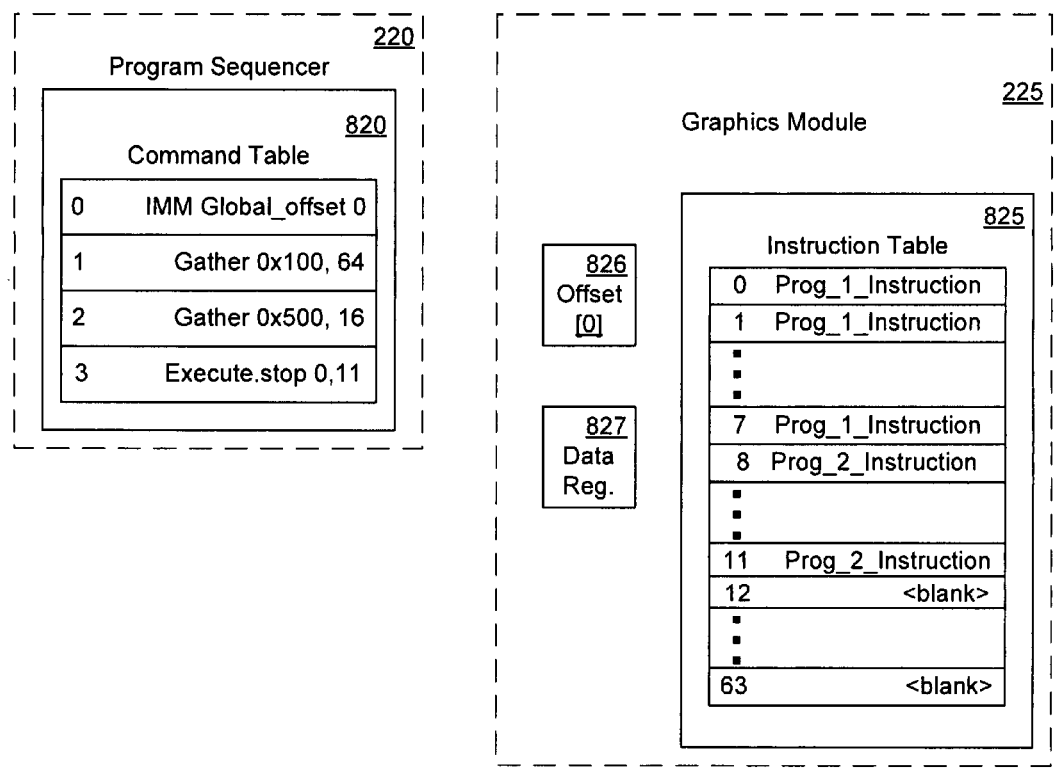
FIG. 8 is an illustration of loading instructions corresponding to two programs into an instruction table, in accordance with one embodiment of the present invention.

With reference to FIG. 8, a process of loading instructions for multiple programs is illustrated, in accordance with one embodiment. In the depicted embodiment, the command table 820, associated with a program sequencer in a graphics pipeline, has been loaded with several command instructions. As the program sequencer carries out these command instructions, it generates register packets, which will then alter the state of instruction table 825, which is associated with graphics module 225.

As discussed previously, a command table may be loaded with command instructions from various sources. In one embodiment, for example, a GPU driver executing on a host computer may pass these command instructions to a GPU, enhanced to the graphics pipeline and program sequencer.

Command instruction 0, in the depicted embodiment, is an "immediate" instruction, and instructs the program sequencer to set the global offset to zero. As such, the offsets associated with the instruction tables for the various modules within the pipeline will be set to zero as well. In some embodiments, e.g., where no global offset registries utilized, multiple command instructions may be utilized, to said each individual offset register to zero, or some other starting value.

Command instruction 1, in FIG. 8, is a "gather" operation, instructing the program sequencer to read 64 words from memory location 0x100. In some embodiments, the program sequencer will generate appropriate register packets from the instruction blocks read from memory at this location. These register packets will be passed down the graphics pipeline, where they will be consumed by the appropriate modules within the pipeline. In the depicted embodiment, each instruction will be written to data register 827, and will be loaded into instruction table 825 beginning from the position indicated by offset 826. For example, if the program gathered during command instruction 1 is an eight instruction program, entries 0 through 7 will be written. After the final instruction from this first program is written, the offset will point to entry eight, the first available entry in instruction table 825.

Command instruction 2, in FIG. 8, is also a "gather" operation. A second gather operation may be used in situations where additional instruction blocks need to be loaded into the pipeline before data processing begins, e.g., where multiple programs are loaded into the same instruction tables, and executed together on the data packets which passed his graphics pipeline. In the depicted embodiment, command instruction 2 indicates that the program sequencer should read 16 words from memory location 0x500. The program sequencer may again generate register packets corresponding to the instruction blocks retrieved from this memory location, and pass those register packets down the pipeline. In the depicted embodiment, the instructions contained in these packets will be written first to data register 827, and then loaded into instruction table 825, beginning from the first available entry as indicated by the offset register. If this second program is a for instruction program, for example, it will be written to entries 8 through 11 in table 825.

Command instruction 3, in the depicted embodiment, is an execute.stop instruction, and instructs the program shader to process received data packets by configuring the modules in the pipeline to perform the instructions contained entries 0 through 11.

By loading instruction tables in this manner, e.g., through the use of the offset register, the program sequencer can load multiple programs into a single instruction table at the same time, in an address independent manner. As such, the programs being loaded do not need to include an explicit instruction table offset. Therefore, the use of the program sequencer, the offset register, and this approach to coding instructions allows for a more flexible and adaptable graphics pipeline.

Altering a Program

As noted previously, one issue in handling multiple programs in the same instruction table is that if one of the programs is changed, it may adversely affect other programs currently loaded into the table, e.g., through a read-modify-write interaction. Some embodiments address this problem through the use of the offset register.

Figure 9:
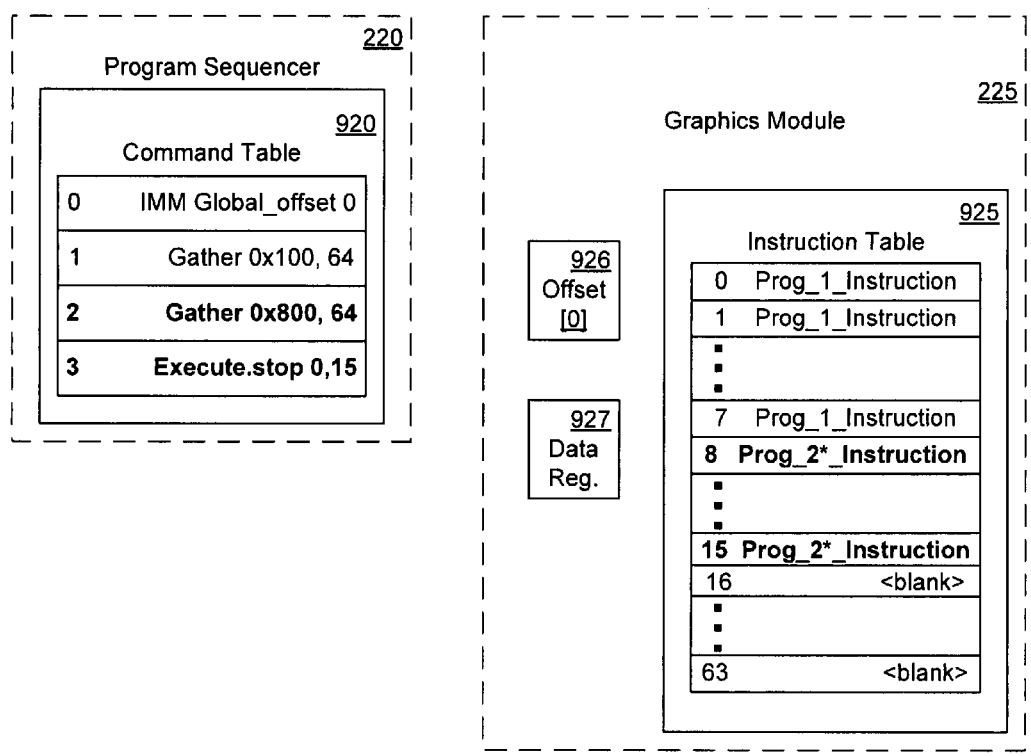
FIG. 9 is an illustration of reloading instructions corresponding to an updated program into an instruction table, in accordance with one embodiment of the present invention.

One approach to handling modified shader programs is to completely reload the affected instruction tables. This approach is illustrated in FIG. 9. The command instructions for the program sequencer have been modified from those depicted in FIG. 8. Command table 920 reflects the same command instructions 0 and 1, but command instruction 2 indicates a different location in memory, and directs the program sequencer to read 64 words from location 0x800.

Offset 926 is again initialized zero, and the instructions corresponding to the first program are passed through data register 927, and written to instruction table 925 as entries 0 through 7. The instructions corresponding to the second program are then written to instruction table 925 beginning at the first available location, as indicated by the offset register. In the depicted embodiment, the second program is an eight instruction program, and so is written to entries 8 through 15.

Command instruction 3 is still an execute.stop instruction, but now instructs the program sequencer to configure the modules in the pipeline to perform the instructions contained in entries 0 through 15.

In some embodiments, the first program may have been altered, rather than the second. In these embodiments, the approach described with reference to FIG. 9 is essentially unaltered: the altered first program is gathered from memory, and loaded into the instruction table as indicated by the offset register; the second program is then gathered, and inserted into the instruction table beginning at the first available location.

Efficient Instruction Table Updating

Figure 10:
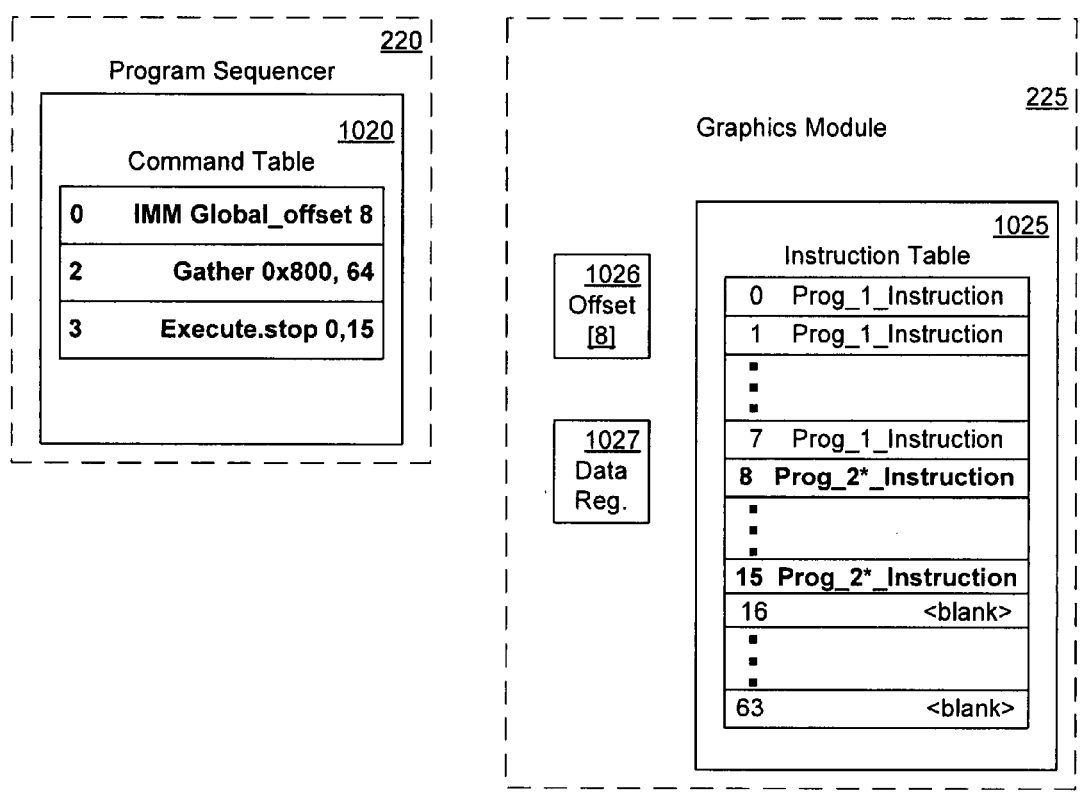
FIG. 10 is an illustration of an efficient approach to updating instructions in an instruction table, in accordance with one embodiment of the present invention.

In some embodiments, a more efficient approach is available, as illustrated in FIG. 10. If, as in the depicted embodiment, the first program is on altered, and the second program has been changed, command table 1020 for the program sequencer may include command instructions such that only the changed instructions are retrieved from memory and written to the instruction table. This approach offers a savings of for that described above, with reference to FIG. 9, in that duplicative memory accesses are reduced or eliminated.

As shown in FIG. 10, command instruction 0 sets the global offset value equal to 8, e.g., the first location in the instruction table after the unchanged first program. Command instruction 1 then gathers the new program from memory location 0x800, and generates the appropriate register packets. Because offset to a thousand 26 is set initially 28, the first instructions corresponding to this new second program are written to instruction table 1025 beginning at position 8. In this way, the second program is written to the same memory locations, e.g., entries 8 through 15, as in the approach described with reference to FIG. 9. However, this approach does not require reloading the first program into entries 0 through 7. Command instruction 2 is the same execute.stop instruction as described previously, and still instructs the program sequencer to configure the modules in the pipeline to perform the instructions contained in entries 0 through 15.

In some embodiments, the first program may have been altered, rather than the second. In these embodiments, the approach described with reference to FIG. 10 may change, depending upon the number of instructions involved in the altered program. If the number of instructions remains constant, the new program can be written over top of the old program, without the need to reload the second program or to alter the execution command. If, however, the number of instructions either decreases or increases, some alteration may be necessary. In one embodiment, for example, the offset is set to the first available location in the instruction table where the altered program may be written sequentially. The instructions for the new first program are then written to this location, and if the execution commands for the program sequencer are altered in such a way that the first program is executed first, and then execution jumps to the beginning of the second program. In one embodiment, a second execute command is utilized to perform this jump; the second command indicates the starting sequence and length of the second program.

Software Assisted Shader Merging

Figure 11:
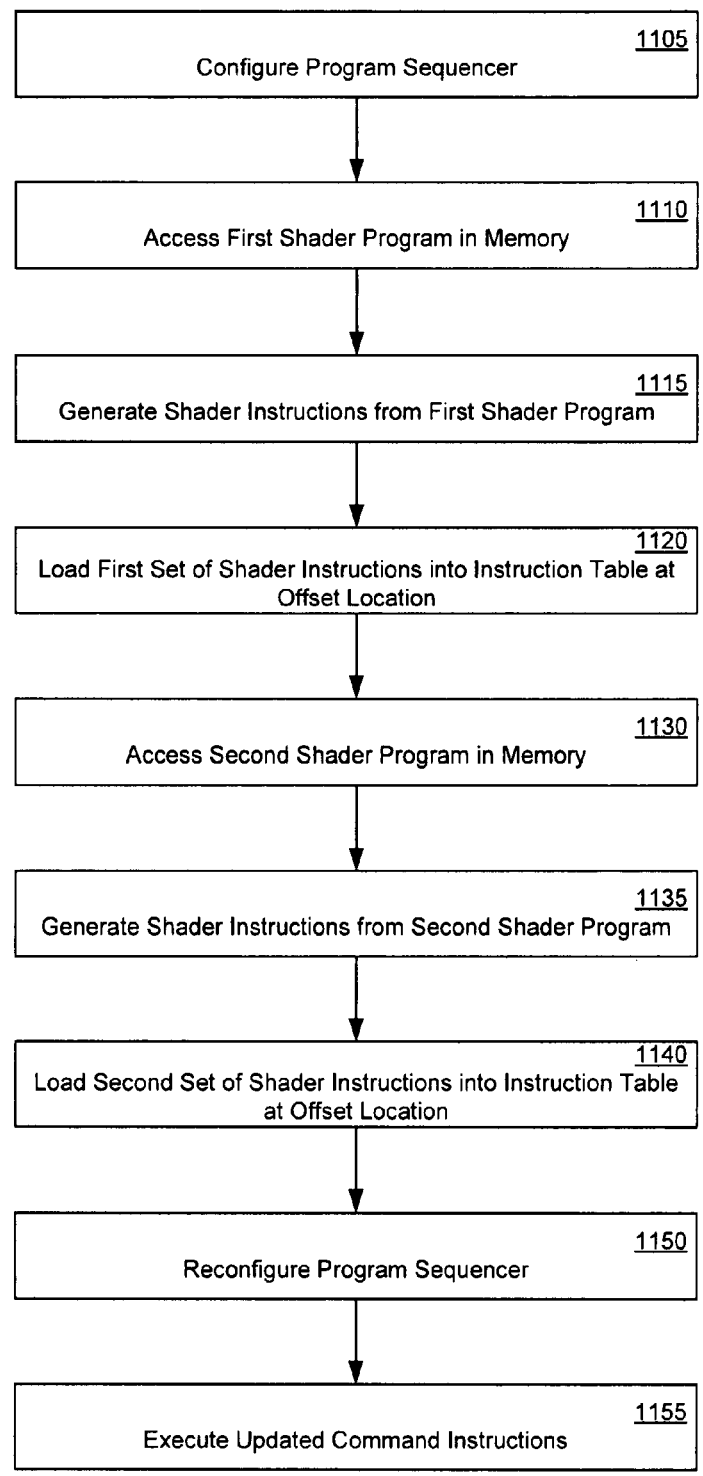
FIG. 11 is a flowchart of a method of implementing software assisted shader merging, in accordance with one embodiment of the present invention.

With reference now to FIG. 11, a flowchart 1100 of a method of implementing software assisted shader merging is depicted, in accordance with one embodiment. Although specific steps are disclosed in flowchart 1100, such steps are exemplary. That is, embodiments of the present invention are well suited to performing various other (additional) steps or variations of the steps recited in flowchart 1100. It is appreciated that the steps in flowchart 1100 may be performed in an order different than presented, and that not all of the steps in flowchart 1100 may be performed.

With reference to step 1105, a program sequencer in a graphics pipeline is configured. In various embodiments, as noted previously, the method and approach of configuring the program sequencer may vary. For example, in one embodiment, a GPU driver issues a series of command instructions to the program sequencer, which configure the program sequencer to control the graphics pipeline. In one such embodiment, a series of command instructions are loaded into a command table associated with the program sequencer; these command instructions control the operation of the program sequencer, which in turn governs the flow of data to the graphics pipeline.

With reference now to step 1110, a first shader program stored in memory is accessed. In some embodiments, shader programs are made up of multiple instruction blocks, and stored in memory, e.g., graphics memory or system memory. The instruction blocks are made up of instructions intended for modules within the graphics pipeline. These instructions configure the various modules perform certain tasks on data packets being passed through the pipeline. These instruction blocks are retrieved, e.g., by the program sequencer carrying out a gather operation.

With reference now to step 1115, shader instructions are generated from the first shader program. As noted previously, in some embodiments, shader programs are made up of a collection of instruction blocks, which in turn are made up of individual instructions. In some embodiments, instructions may be read, one of the time, directly from memory; in another embodiment, individual instructions may need to be derived, e.g., by the program sequencer, from the shader program.

With reference now to step 1120, this first set of shader instructions are loaded into an instruction table for a pipeline module at locations indicated by an offset register. As described previously, some embodiments utilize an offset register as a "pointer." The value contained in the offset register indicates a position within the instruction table for the related module where instructions should be loaded. In one such embodiment, the program sequencer generates register packets, which contain one or more instructions intended for a particular module. The module recognizes the register packet, e.g., by reading an address field included in the header of the packet, and extracts the instructions contained therein. These instructions are then loaded into the instruction table for the module, beginning at the position indicated by the offset register.

With reference now to step 1130, a second shader programs stored in memory is accessed.

With reference now to step 1135, shader instructions are generated from this second shader program.

With reference now to step 1140, the second set of shader instructions are loaded into the instruction table for the pipeline module at the position indicated by the offset register, e.g., at the first available position following the first set of shader instructions. In this way, shader instructions corresponding to multiple shader programs can be passed to their intended destination and utilized by the appropriate module, without the need for the shader program to include specific memory addresses.

With reference now to step 1150, the program sequencer for the graphics pipeline is reconfigured. In some embodiments, the program sequencer, and specifically the command table for the program sequencer, is reconfigured. This may occur, for example, when a change has been made to one of the shader programs currently loaded in a graphics pipeline, and the GPU driver wishes to utilize the changed shader program. In one such embodiment, the GPU driver reloads the command table for the program shader.

With reference now to step 1155, the program sequencer executes the updated command instructions, to load a modified shader program into the appropriate instruction table. In some embodiments, the step entails gathering the modified shader program from memory, generating register packets, and forwarding the register packets down the pipeline. Modules within the pipeline will recognize packets intended for their consumption, and load the updated instructions into the instruction tables. In some embodiments, the updated shader program can be written over top of a shader program is intended to replace. In other embodiments, the shader program may be written to a different location within the instruction table, e.g., where sufficient blank or unused entries exist, in order to allow the shader program to be written continuously.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are thus described. While the present invention has been described in particular embodiments, it should be appreciated that the present invention should not be construed as limited by such embodiments, but rather construed according to the following claims.

What is claimed is:

1. A method of software assisted shader merging for a graphics pipeline, comprising:
　　accessing a first shader program in memory;
　　generating a register packet for configuring a graphics module within the graphics pipeline, wherein the register packet comprises an address intended for a target graphics module and a first shader instruction generated from the first shader program;

upon receipt of the register packet by the target graphics module, loading the first shader instruction into an instruction table of the target graphics module at a first location indicated by an offset register associated with the target graphics module, wherein the graphics pipeline comprises the instruction table;

accessing a second shader program in memory;

generating a second shader instruction from the second shader program; and loading the second shader instruction into the instruction table at a second location indicated by the offset register, wherein the first shader instruction is in the instruction table when the second shader instruction is loaded into the instruction table.

2. The method of claim 1, further comprising:
updating the offset register to indicate the second location.

3. The method of claim 2, wherein the second location comprises an available location within the instruction table.

4. The method of claim 1, wherein the first shader program does not include an explicit instruction table offset.

5. The method of claim 1, wherein accessing the first shader program comprises performing a direct memory access (DMA) transfer of an instruction block associated with the first shader program.

6. The method of claim 1, further comprising:
accessing a modified second shader program in memory;
generating a modified second shader instruction from the modified second shader program; and
loading the modified second shader instruction into the instruction table at the second location, without reloading the first shader instruction.

7. The method of claim 6, further comprising:
configuring a program sequencer to control the graphics pipeline.

8. The method of claim 7, wherein configuring the program sequencer comprises loading a plurality of command instructions into a command table associated with the program sequencer.

9. The method of claim 7, further comprising:
reconfiguring the program sequencer, to preserve an execution order of the first shader instruction and the modified second shader instruction.

10. The method of claim 6, wherein the loading of the modified second shader instruction into the instruction table at the second location is performed without reloading a third shader instruction generated from the second shader program.

11. A graphics processing unit (GPU) for loading a shader program, comprising:
an integrated circuit die comprising a plurality of stages of the GPU;
a memory interface for interfacing with a graphics memory; and
a host interface for interfacing with a computer system, wherein the plurality of stages comprises a graphics pipeline configured to:
access a first shader program in memory;
generate a register packet for configuring a graphics module within the graphics pipeline, wherein the register packet comprises an address intended for a target graphics module and a first shader instruction generated from the first shader program;
upon receipt of the register packet by the target graphics module, load the first shader instruction into an instruction table of the target graphics module at a first location indicated by an offset register associated with the target graphics module, wherein a stage of the plurality of stages of the GPU comprises the instruction table;
access a second shader program in memory;
generate a second shader instruction from the second shader program; and
load a second shader instruction into the instruction table at a second location indicated by the offset register, wherein the graphics pipeline is operable to load the second shader instruction into the instruction table when the first shader instruction is in the instruction table.

12. The GPU of claim 11, wherein the graphics pipeline comprises a program sequencer configured to control the graphics pipeline.

13. The GPU of claim 12, wherein the program sequencer is configured by loading a plurality of command instructions into a command table associated with the program sequencer.

14. The GPU of claim 12, wherein the graphics pipeline is further configured to:
access a modified second shader program in memory;
generate a modified second shader instruction from the modified second shader program; and
load the modified second shader instruction into the instruction table at the second location, without reloading the first shader instruction.

15. The GPU of claim 14, wherein the program sequencer is reconfigured to preserve an execution order of the first shader instruction and the modified second shader instruction.

16. The GPU of claims 11, wherein the first shader program does not include an explicit address.

17. A handheld computer system device, comprising:
a system memory;
a central processing unit (CPU) coupled to the system memory; and
a graphics processing unit (GPU) communicatively coupled to the CPU, wherein the GPU includes a graphics pipeline for executing a shader program, and wherein the graphics pipeline is configured to:
access a first shader program in memory;
generate a register packet for configuring a graphics module within the graphics pipeline, wherein the register packet comprises an address intended for a target graphics module and a first shader instruction generated from the first shader program;
upon receipt of the register packet by the target graphics module, load the first shader instruction into an instruction table of the target graphics module at a first location indicated by an offset register associated with the target graphics module, wherein the graphics pipeline comprises the instruction table;
access a second shader program in memory;
generate a second shader instruction from the second shader program; and
load a second shader instruction into the instruction table at a second location indicated by the offset register, wherein the graphics pipeline is operable to load the second shader instruction into the instruction table when the first shader instruction is in the instruction table.

18. The handheld computer system device of claim 17, wherein the first shader programs stored in memory does not include an explicit instruction table offset.

19. The handheld computer system device of claim 17, wherein the graphics pipeline is further configured to:
access a modified second shader program in memory;

generate a modified second shader instruction from the modified second shader program; and load the modified second shader instruction into the instruction table at the second location, without reloading the first shader instruction.

20. The handheld computer system device of claim 19, wherein the graphics pipeline is further configured to preserve an execution order of the first shader instruction and the modified second shader instruction.

\* \* \* \* \*